United States Patent [19]

Uriu et al.

[11] Patent Number: 5,022,263
[45] Date of Patent: Jun. 11, 1991

[54] THERMAL FUEL LEVEL DETECTOR

[75] Inventors: Eiichi Uriu, Hirakata; Koji Nishida, Kawanishi; Munehiro Tabata, Ibaraki, all of Japan

[73] Assignee: Matsushita Electric Industrial Co., Ltd., Osaka, Japan

[21] Appl. No.: 362,400

[22] PCT Filed: Sep. 30, 1988

[86] PCT No.: PCT/JP88/00997

§ 371 Date: Aug. 2, 1989

§ 102(e) Date: Aug. 2, 1989

[87] PCT Pub. No.: WO89/03021

PCT Pub. Date: Apr. 6, 1989

[30] Foreign Application Priority Data

Oct. 2, 1987 [JP] Japan .................. 62-250117
Jun. 7, 1988 [JP] Japan .................. 63-140017
Jun. 7, 1988 [JP] Japan .................. 63-140019
Jun. 22, 1988 [JP] Japan .................. 63-153933

[51] Int. Cl.$^5$ ............................ G01F 23/24
[52] U.S. Cl. ............................ 73/295; 340/620; 340/304 R
[58] Field of Search ............... 73/295, 304 R; 340/620

[56] References Cited

U.S. PATENT DOCUMENTS

| 4,129,848 | 12/1978 | Frank et al. | 73/295 |
| 4,425,795 | 1/1984 | Albrecht et al. | 73/295 |
| 4,567,762 | 2/1986 | Hoppert et al. | 73/295 |
| 4,590,797 | 5/1986 | Beaubatie et al. | 73/295 |
| 4,609,913 | 9/1986 | Arbogast et al. | 73/295 |

FOREIGN PATENT DOCUMENTS

| 57151534 | 3/1956 | Japan . |
| 4940768 | 8/1972 | Japan . |
| 50-89068 | 7/1975 | Japan . |
| 55-895 | 1/1980 | Japan . |
| 58-191927 | 11/1983 | Japan . |
| 59-148826 | 8/1984 | Japan . |
| 62-102120 | 5/1987 | Japan . |

OTHER PUBLICATIONS

Nippondenso Co., Ltd., Journal of Nippondenso Technical Disclosure, p. 101, Jul. 15, 1986.

Primary Examiner—William A. Cuchlinski, Jr.
Assistant Examiner—William C. Dowling
Attorney, Agent, or Firm—Stevens, Davis, Miller & Mosher

[57] ABSTRACT

Provided is a fuel level detector for use in a fuel tank of an automobile or the like which can accurately detect a fuel level with a reduced power consumption exhibiting an improved reliability regardless of the ambient temperatures and the temperatures of liquid fuel in order to overcome the problems involved in a thermistor method and a metal wire method. A spontaneously heated sensing resistor having a high temperature resistance coefficient is formed on a substrate so as to detect a change in the resistance value due to cooling by heat of vaporization at a portion of the sensing resistor which is dipped in fuel as a differential output voltage. In order to prevent errors in the differential output voltage due to the correction of the ambient temperature in the fuel tank, a temperature compensating resistor is provided on the substrate.

18 Claims, 8 Drawing Sheets

THERMAL FUEL LEVEL DETECTOR

BACKGROUND OF THE INVENTION

1. FIELD OF THE INVENTION

The present invention relates to a thermal fuel level detector capable of detecting the level of fuel remaining in a fuel tank of an automobile or the like.

2. RELATED ART STATEMENT

Previously, most fuel level detectors of the type described above comprises a slide-content type potentiometer attached to an end of a fuel level float. A conventional structure in which such a potentiometer is employed experiences a problem of contact damage therein due to the presence of sulfides or other fuel additives since the contact thereof is exposed to fuel or steam. It is difficult to keep the conventional structure providing accurate slide-resistance values for a long time.

Another problem is experienced with the conventional structure in that it is difficult to obtain a resistor with a shape which corresponds to the shape of a fuel tank, causing a large error in detection of a fuel level.

Although various methods have been devised in order to overcome the above-described problems, none has yet been put into practice due to cost and performance drawbacks. For example, a liquid level sensor disclosed in Japanese Patent Laid-Open No. 59-148826 and structured such that thermistor layers are formed in order on a rod-like or an elongated insulating material can relatively accurately detect the liquid level under certain temperature conditions. However, since thermistors do not exhibit linear resistance changes with respect to temperature changes, such liquid level sensors cannot accurately detect a continuous change in liquid level where the temperature of either the liquid or the ambient changes even if a temperature compensating sensor is additionally provided. Thermistors further experience a problem of insufficient protection against gasoline containing sulfides, more particularly against light oil. Therefore, such liquid level sensors cannot be used as a fuel level detector for an automobile.

Figure 1:
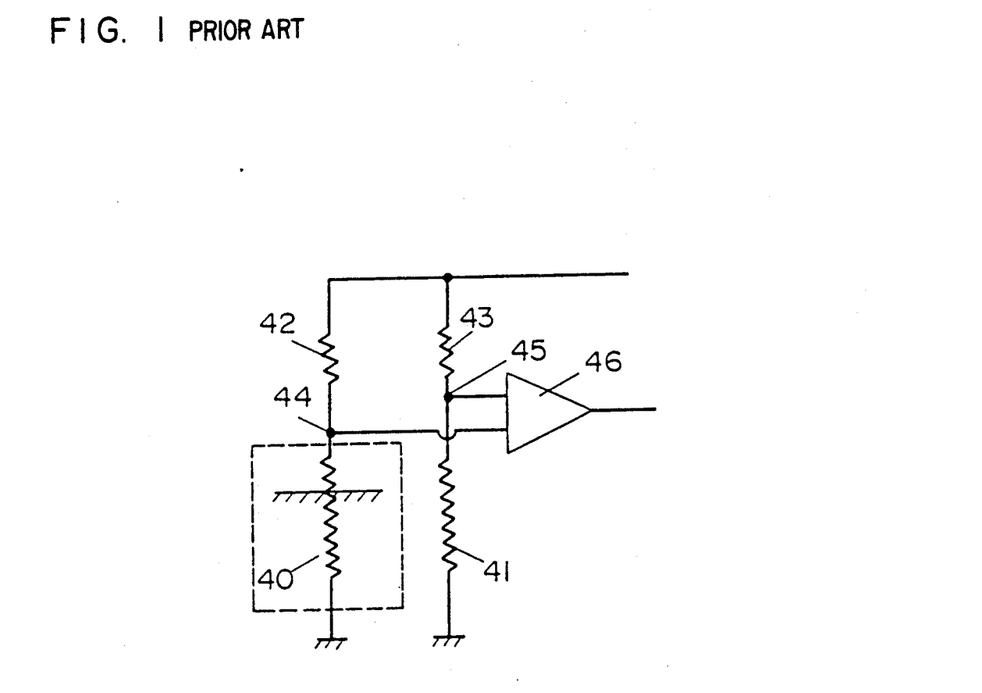
FIG. 1 is a circuit diagram for use in a conventional fuel level detector comprising metal wires.

Furthermore, the Nippon Denso Publication Technology Monogram (No. 48-101, published on July 15, 1986) discloses a system formed, as shown in FIG. 1, such that: one of two metal wires made of the same material and having the same temperature resistance coefficient is arranged to be a self-heating sensing resistance wire 40, with the other of the wires being arranged to be a temperature compensating resistance wire 41; the self-heating sensing resistance wire 40 is in part dipped in liquid fuel; external resistors 42 and 43 whose resistance values are equal are used with the former to form a bridge circuit; a potential difference between junctions 44 and 45 is amplified by a differential amplifier 46 to detect a difference in temperature between the self-heating resistance wires corresponding to said potential difference, so that the liquid level is detected. However, this system involves two serious problems. First, since the temperature compensating resistance wire 41 is disposed in the part of the fuel tank in which the same is not dipped in the liquid fuel, although a correction to compensate a change in ambient temperature, a correction cannot be made to compensate a change in temperature of the liquid fuel. Secondly, since metal wires are used, the resistance value per unit length of the same becomes excessively low even if the diameter of the wire is made as small as possible while still ensuring the strength of the metal wire. This leads to a problem in that the power consumption by the above-described system imposes a high load on a car battery which is used as the power source of this system. Therefore, such a system cannot be put into practical use.

SUMMARY OF THE INVENTION

To this end, an object of the present invention is to provide a fuel level detector which can accurately detect a fuel level with a reduced power consumption exhibiting an improved reliability regardless of the ambient and liquid fuel temperatures in order to overcome the problem of contact damage involved in a thermistor or a metal wire type system.

In order to overcome the above-described problem, the present invention is characterized in that a self-heating sensing resistor having a relatively high temperature resistance coefficient is formed on a substrate so as to detect a change in the resistance value of the sensing resistor due to cooling caused by heat of vaporization along a portion of the sensing resistor 20 which is dipped in fuel, as a differential output voltage. A temperature compensating resistor is provided on the substrate, for compensating the differential output voltage for ambient temperature in the fuel tank in order to prevent an error in the differential output voltage.

According to the present invention, since the self-heating sensing resistor which can radiate heat when it is energized and the temperature compensating resistor are formed to have equal lengths, and since each of the above-described two temperature compensating resistors comprises a film resistor made of platinum, gold, silver, palladium, ruthenium oxide, copper, nickel, steel or an alloy thereof, the fuel level can be accurately detected even if the ambient temperature and/or the temperature of the liquid fuel in the fuel tank is changed.

Furthermore, since the self-heating sensing resistor and the temperature compensating resistor are formed respectively of film resistors, the resistance value per unit length can be increased in comparison with the case of the metal wire. Therefore, a temperature detecting fuel level detector exhibiting reduced power consumption and having a practical advantage can be obtained.

Furthermore, a further accurate, high sensitive, reduced cost temperature detecting fuel level detector can be obtained in the case where the above-described temperature detecting resistor film is formed by a plating process or by baking the coated and printed metallo-organic substance, or in the case where the above-described temperature detecting elements are formed in a chip shape and the thus-formed chip-shaped temperature detecting elements are mounted on a substrate made of epoxy glass, polyethylene telephthalate (PET), polyester, polyimide, denatured of the former materials, polyparabanic acid, an aramid film, bismuthreimide triazine resin (manufactured by Mitsubishi Gas Chemical Industries Ltd.), Bectra (manufactured by Poly Plastic), polyacetal, glass, or the like.

DESCRIPTION OF THE PREFERRED EMBODIMENTS

First Example

Figure 2A:
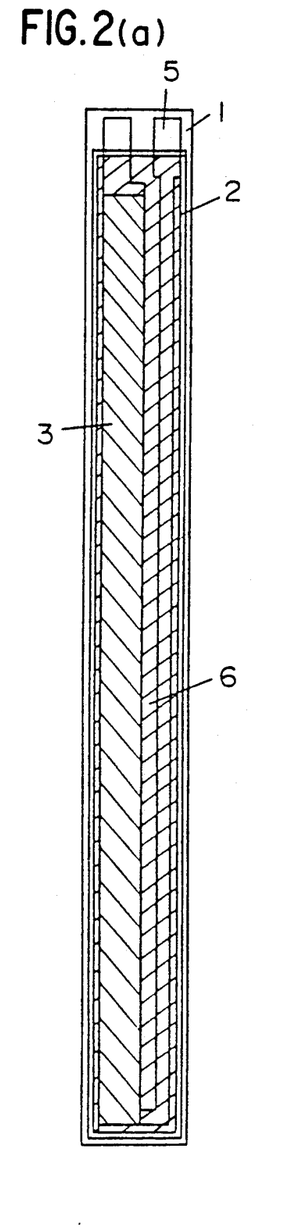
FIGS. 2A and 2B are plan views which illustrate detection portions for use in a fuel level detector according to an embodiment of the present invention.
Figure 2B:
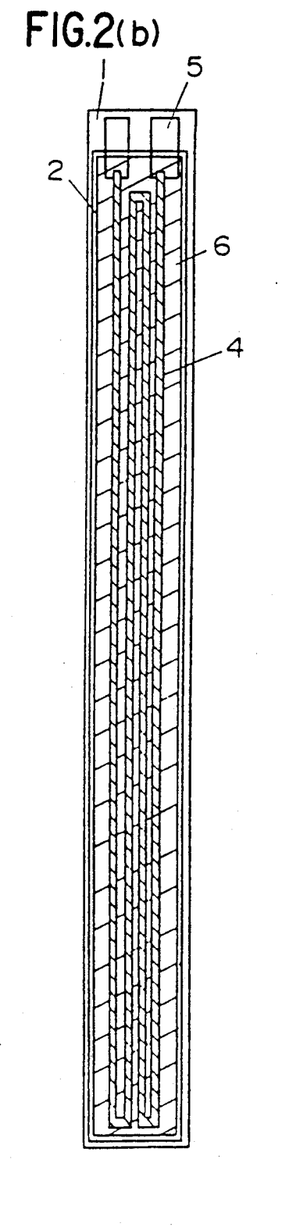

FIGS. 2A and 2B are views which illustrate the structures of the pattern of a temperature detecting resistor disposed in a detection portion of a fuel level detector according to an embodiment of the present invention. Referring to FIG. 2, reference numeral 1 represents an insulating ceramic substrate. Reference numeral 2 represents an $SiO_2$-$Al_2O_3$—$B_2O_3$ group underglazed glass having a softening point of 920° C. with which the ceramic substrate 1 is coated. Reference numeral 3 represents a self-heating sensing resistor having a high temperature resistance coefficient and formed on the underglazed glass 2 by means of printing and baking. Reference numeral 4 represents a temperature compensating resistor made of the same material as that of the self-heating sensing resistor 3, and having substantially equal lengths. According to this embodiment, platinum metallo-organic paste obtained by adding a binder such as resin acid, its modified form or adding the like to a platinum salt of sulfide or mercaptide of dimer to pentmer of terpenes is used to print a desired pattern before it is baked at 900° C., whereby a platinum thin foil temperature detecting resistor body having a thickness of substantially 4,000 Å is formed. The self-heating temperature detecting resistor body exhibits a resistance value of 20 Ω at 0° C., while the temperature compensating resistor exhibits a resistance of 5 kΩ at the same temperature, and the above two types of resistors exhibit equal temperature resistance coefficients of about 3,700 ppm/° C. Reference numeral 5 represents an output electrode having a relatively low conductor resistance and made of, according to this embodiment, silver palladium (substantially 15 μm in thickness).

The above described temperature detecting resistors 3 and 4 and the electrode 5 are coated with a borosilicate lead group overcoat glass film 6 as a protection coating for the purpose of providing oil resistance, chemical resistance, and insulation.

Figure 3:
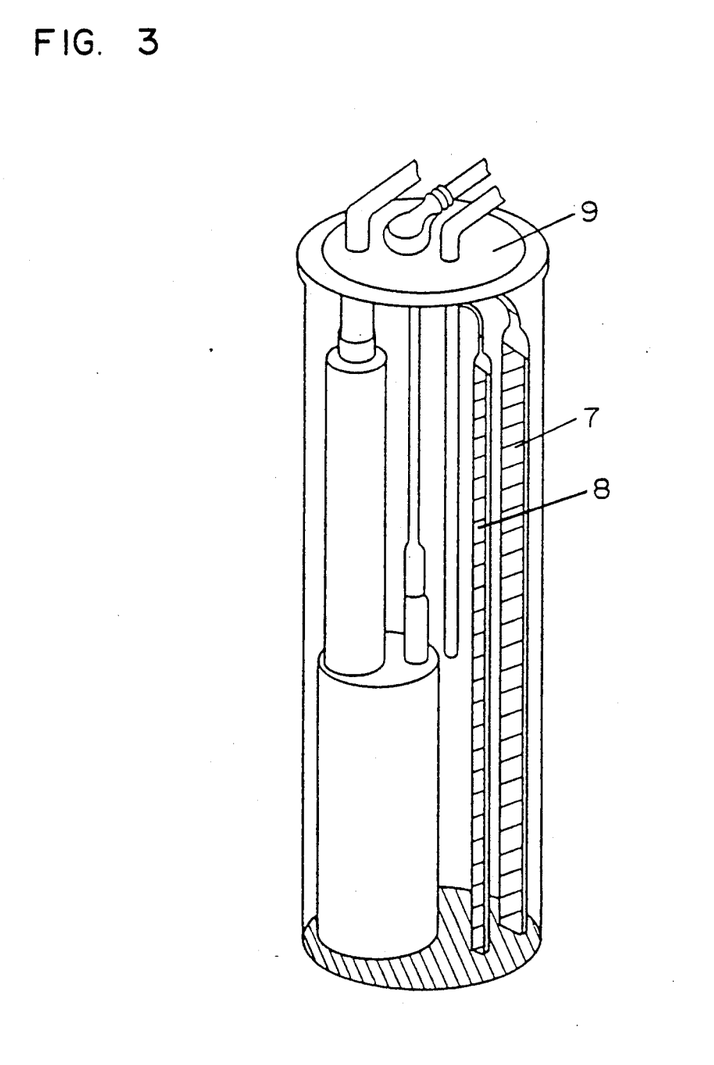
FIG. 3 is a perspective view which illustrates a state where the detection portions are disposed in a fuel tank.

FIG. 3 is a view which illustrates an example wherein a pair of elements consisting of a first temperature detecting element 7 including the self-heating sensing resistor and a second temperature detecting element 8 including the temperature compensating resistor are disposed in a fuel pump unit 9 provided in a fuel tank. These elements are electrically connected to each other through a circuit shown in FIG. 4. Referring to this drawing, reference numeral 11 represents the detection portion shown in FIG. 2, which comprises the self-heating sensing resistor 12 and the temperature compensating resistor 13 shown in FIG. 2. These resistors are connected to the corresponding resistors 14 and 15 whereby resistance bridge circuits are formed.

Figure 4:
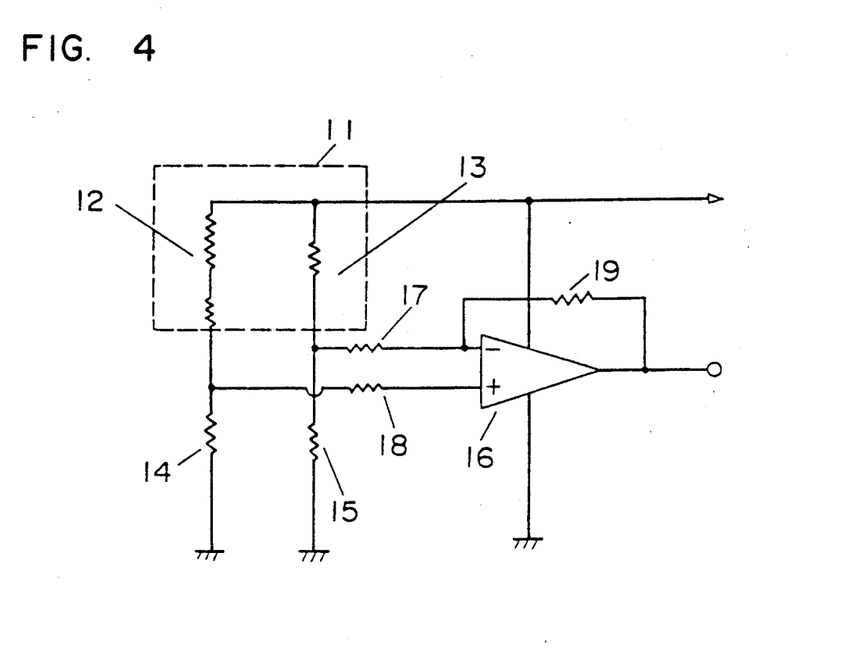
FIG. 4 is a circuit diagram for use in the fuel level detector.

The outputs of these bridge circuits are connected to the corresponding inverting input terminal and a non-inverting input terminal of an operation amplifier 16 via the corresponding resistors 17 and 18, this operation amplifier 16 forming a differential amplifier circuit. Reference numeral 19 represents a resistor.

That is, in the above described circuit, the resistance value of the sensing resistor 12 which undergoes heating at a predetermined voltage or a predetermined current, varies depending upon the fuel level. Such change in resistance value is inputted as a change in the potential at the output of the bridge circuit, to the differential amplifier circuit. This differential amplifier circuit outputs at the output terminal thereof any difference in voltage so that any change in the fuel level can be outputted as a change in voltage.

Furthermore, since the temperature compensating resistor 13, is thermally separated from the self-heating sensing resistor 12, the heat which has been spontaneously given by the self-heating sensing resistor 12 is prevented from being transmitted to the temperature compensating resistor 13.

Therefore, since the temperature compensating function of the temperature compensating resistor 13 with respect to the ambient temperature in the gasoline tank can be properly effected, an accurate fuel level detection can be achieved.

Figure 5:
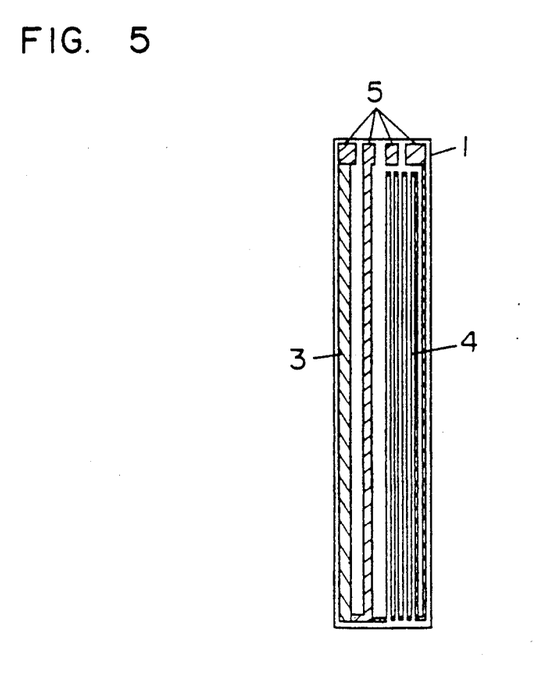
FIG. 5 is a plan view which illustrates a detection portion of a temperature detecting fuel level detector in which a self-heating sensing resistor 3 and a temperature compensating resistor are formed on one insulating substrate.

Similarly to this embodiment, a metallic organism of gold, silver, ruthenium, and palladium may be used to form a metal or metal oxide thin film which can serve as a temperature detecting resistor. Although the self-heating sensing resistor and the temperature compensating resistor are formed on individual substrates according to this example, they may, as shown in FIG. 5, be formed on one and the same substrate if necessary.

EXAMPLE 2

Paste prepared by mixing a nickel metallic organic substance such as nickel octanate and ferrous metallic organic substance such as octylic acid salt of steel at a 9:1 ratio, and then by adding modified resin or the like as a binder, is used to form the self-heating sensing resistor and the temperature compensating resistor shown in FIG. 2 by means of screen printing. The thus-printed paste is baked in air at 620° C., and then baked for deoxidation at 550° C. in a deoxidation atmosphere, whereby a nickel-steel thin film substantially 2,000 Å thick and exhibiting a temperature resistance coefficient of substantially 4,500 ppm/° C. is obtained. Then, a temperature detecting element prepared by applying a borosilicate overglass coating to the above nickel-steel thin film at 600° C. in an atmosphere of nitrogen is used similarly to the example 1.

Also similarly to this example, a copper metallic organic substance may be used to form a copper thin film which can serve as a heated sensing resistor.

Example 3

Since the self-heating sensing resistor and the temperature compensating resistor shown in FIG. 2 are formed by a nickel boron thin film obtained from an electroless nickel boron plating, the nickel boron thin film can be aged under heat by forming borosilicic overcoat glass at 600° C. in an atmosphere of nitrogen, causing the sintered tightness to be improved. As a result, a nickel boron thin film having a thickness of substantially 2,500 Å and exhibiting a temperature resistance coefficient of 4,200 ppm/° C. is formed.

If necessary, electric plating may be applied.

Then, also the thus-formed temperature detecting element can be used in a manner similar to that of Example 1.

Similarly to this example, a resistance thin film serving as a heated sensing resistor may be made of platinum, gold, silver, palladium, copper, chrome cobalt, steel, or an alloy thereof.

If the temperature resistance coefficient of the self-heating sensing resistor and that of the temperature compensating resistor are equal, an ideal fuel level detection can be conducted. However, it is difficult for the two temperature resistance coefficients to be made equal to each other in practice. In terms of the practical use, no problem is presented if the difference between the above two coefficients is 500 ppm/° C. or less. This leads to a result that the material for the self-heating sensing resistor and the material for the temperature compensating resistor do not need to be the same. However, it is preferable for the temperature compensating resistor to have a length equal to that of the self-heating sensing resistor. However, this does not apply to a case where the lengths of both resistors cannot be equal to each other.

Example 4

Figure 6A:
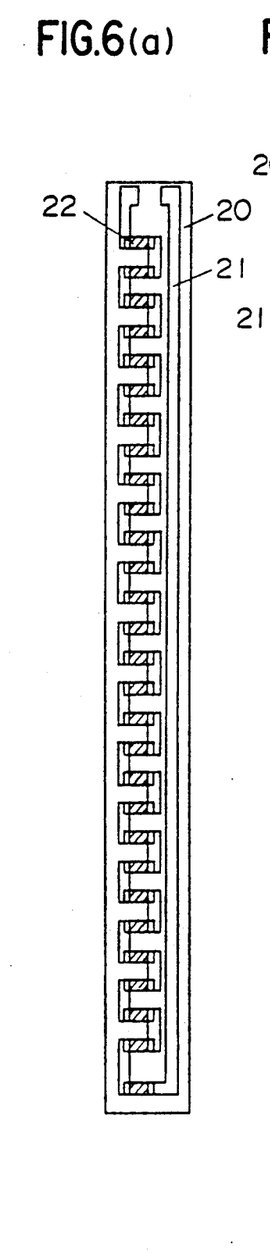
FIGS. 6A and 6B are plan views which illustrate a detection portion of a temperature detecting fuel level detector formed by mounting temperature detecting resistor chips on a substrate.
Figure 6B:
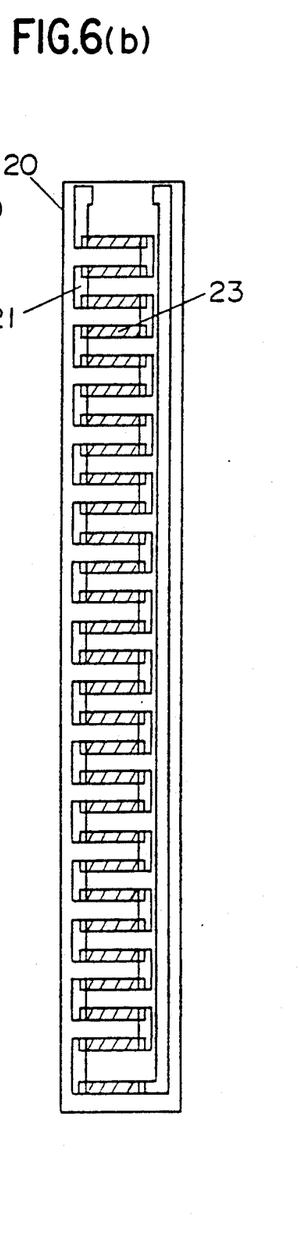

FIGS. 6A and 6B are views which illustrate a detection portion of the fuel level detector according to another example of the present invention.

Referring to FIG. 6, reference numeral 20 represents a 50 μm thick substrate made of a polyimide film, with a conductor 21 having a predetermined circuit pattern being formed on this substrate 20. Reference numeral 22 represents a self-heating platinum sensing resistor chips obtained from the following steps: platinum metallo-organic paste is printed on an underglazed forsterite substrate before it is baked at 900° C.; electrode paste which mainly contains silver is printed in the form of primary electrodes; such printed primary electrodes are baked at 600° C., and borosilicic lead overcoat glass is layered thereover. The thus-prepared chips exhibit a temperature resistance coefficient of 3,700 ppm/° C. and a resistance value of 1.0 Ω at 0° C. Reference numeral 23 represents a temperature compensating platinum resistor chip which is prepared by the same method as that for the self-heating sensing resistor chips, and which exhibits a temperature resistance coefficient of 3,700 ppm/° C. and a resistance value of 50 Ω at 0° C. A fuel level detection exhibiting an excellent thermal response and improved accuracy can be conducted by employing the thus-formed self-heating sensing resistor and the temperature compensating resistor with both being connected to a circuit similar in that shown in FIG. 4, in a manner similar to that of Example 1.

Although the self-heating sensing resistor chips and the temperature compensating resistor chips are mounted on individual substrates in this example, the above two kinds of chips may be mounted on one and the same substrate. As an alternative to the temperature compensating resistor comprising a group consisting of resistors in the form of chips in this example, a temperature compensating resistor formed, as shown in FIG. 2B, on a ceramic substrate may be employed.

Example 5

Figure 7:
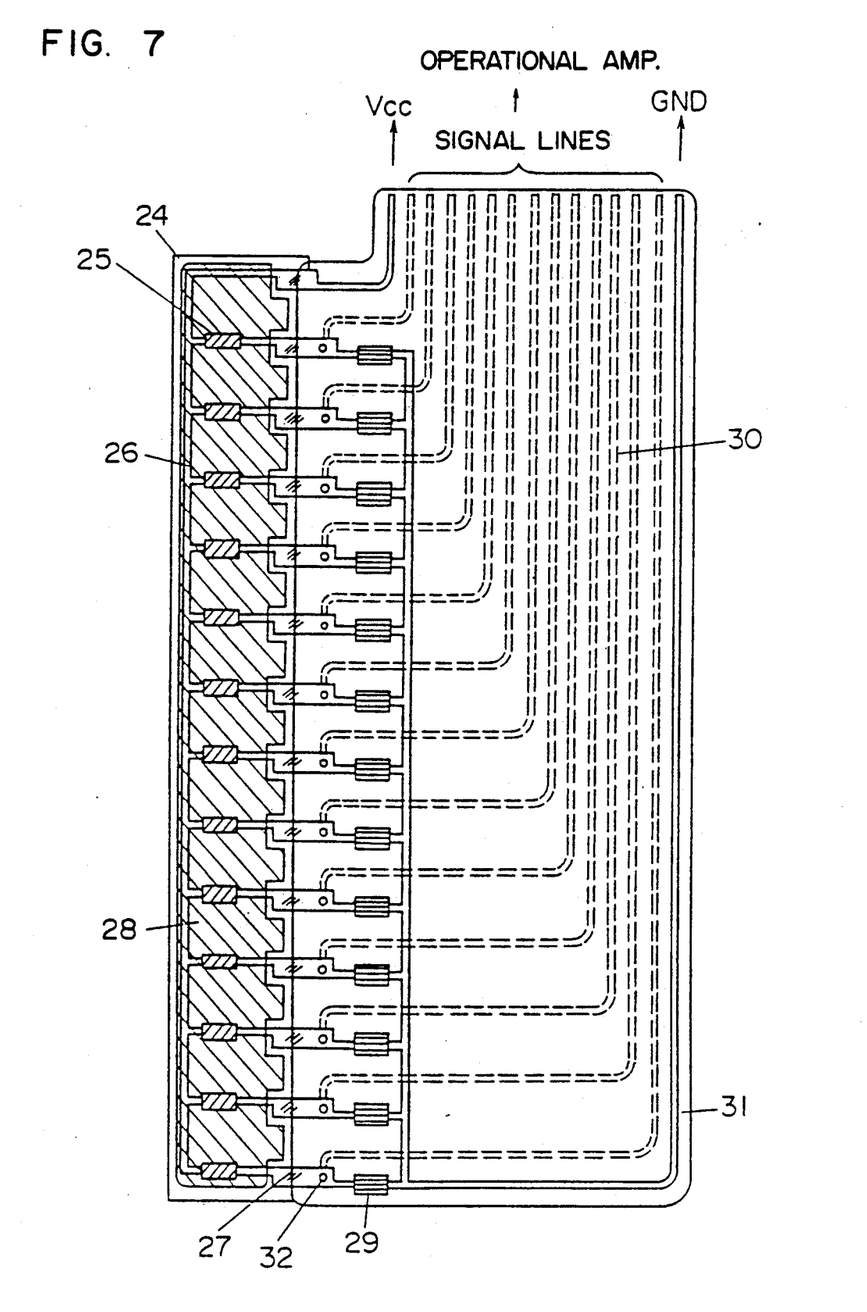
FIG. 7 is a plan view which illustrates a detection portion of a temperature detecting fuel level detector for detecting in a digital manner the liquid level by connecting the self-heating sensing resistors in parallel.

FIG. 7 is a view which illustrates the pattern of the sensing resistor in the detection portion of the fuel level detector according to another example of the present invention. Referring to FIG. 7, reference numeral 24 represents a ceramic substrate. Reference numeral 25 represents thin elongated film shaped self-heating sensing resistors exhibiting a relatively high temperature resistance coefficient and formed on the ceramic substrate 24 by printing and baking, wherein these resistors comprise thin film platinum resistors 4,000 Å thick obtained by baking platinum metallic organic paste in air at 900° C. and exhibit a temperature resistance coefficient of 3,700 ppm/° C. The thus-obtained thin wire shaped sensing resistors 25 are arranged in a plurality of stages in parallel to the fuel surface in a fuel tank. According to this example, 13 sensing resistors 25 in total are formed at the positions which divide the quantity of the remaining fuel into 12 portions. Although the sensing resistors are arranged to be in parallel to the fuel surface in this example, they may be arranged at a predetermined angle with respect to the fuel surface, if necessary. The thus-arranged sensing resistors 25 are connected through thick film-shaped electrodes 26 (having a mean thickness of substantially 15 μm) made of silver palladium and exhibiting a relatively low conductor resistance, whereby a parallel resistor circuit is formed. Reference numeral 27 represents output electrodes disposed at end portions of the sensing resistors 25. Chip resistors 29 exhibiting a relatively low temperature coefficient are mounted on output electrodes 27, and a flexible substrate 31 on which signal lines 30 are formed on the reverse side thereof, signal lines 30 are connected to output electrodes 27 via the through holes 32 by soldering for the purpose of detecting a change in the differential output voltage. Furthermore, the sensing resistors 25 and the electrodes 26 are covered thereover with a borosilicic lead overcoat glass film 28 for the purpose of providing oil resistance and chemical resistance.

Figure 8:
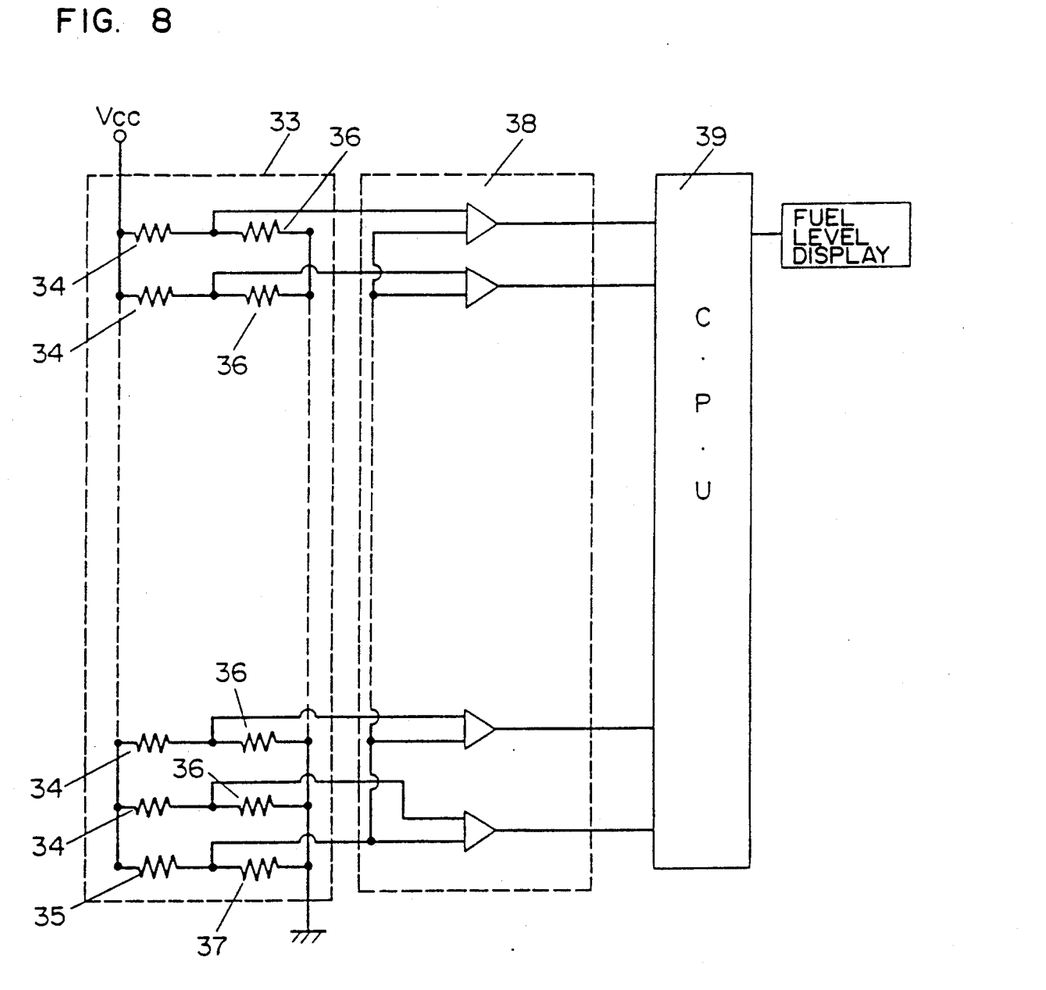
FIG. 8 is a circuit diagram for use in the detector shown in FIG. 6.

FIG. 8 is a view which illustrates a circuit for use in the fuel level detector in which the detection portion shown in FIG. 7 is employed. Referring to this figure, reference numeral 33 represents a detection portion. Twelve self-heating sensing resistors 34 which are connected in parallel to each other and resistors 36 which are connected in series to sensing resistors 34 and which exhibit a relatively low temperature resistance coefficient respectively form resistor bridge circuits in association with a sensing resistor 35 disposed at the lowermost position of the detection portion 33 and resistors 37 which are connected in series to sensing resistor 35. The sensing resistors 34 and 35 exhibit substantially equal temperature resistance coefficients, and preferably, they have the same resistance values.

The output ends of these bridge circuits are respectively connected to inverting input terminals and non-inverting input terminals of an operation amplifier 38 forming a differential amplifier circuit.

Figure 9A:
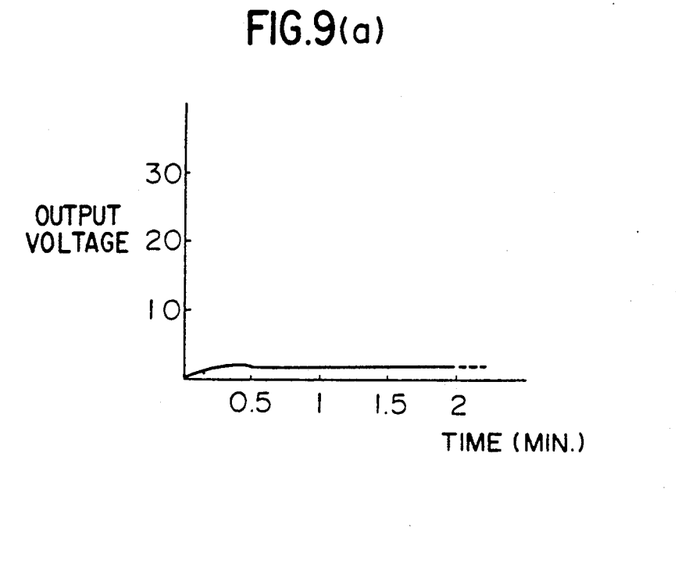
FIG. 9A is a view which illustrates the characteristics of the differential output voltage which can be generated from bridge circuits formed such that both of the temperature detecting resistors are dipped in fuel.
Figure 9B:
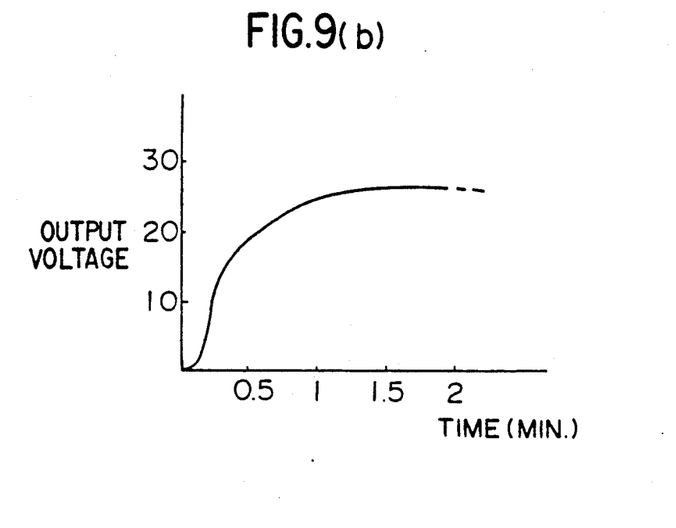
FIG. 9B is a view which illustrates the characteristics of the differential output voltage which can be generated from bridge circuits formed such that one of the temperature resistors is exposed to air.

That is, according to this circuit, the bridge circuit formed by an arrangement consisting of the sensing resistor 35 which is always dipped into fuel and exhibits a small change in resistance value due to its self-heating characteristic and the one of the sensing resistors 34 which is dipped in fuel does not output any differential output voltage as shown in FIG. 9A. However, the bridge circuit formed by the sensing resistor 35 and the sensing resistors which are exposed to air instantaneously outputs a differential output voltage as shown in FIG. 9B. The thus-outputted differential output voltage is amplified by the operation amplifier 38, and then the number X of the sensing resistors from which no differential output voltage was outputted is counted by an arithmetic portion 39.

If X is, for example, 5, the remaining fuel is 5/12 of the fuel capacity of the fuel tank.

Thus, the fuel detection is conducted. In the temperature detecting fuel level detector according to the present invention, a detection is made only as to whether or not a differential output voltage is generated, and the absolute value of the differential output voltage is not detected intact. Therefore, fuel levels can be instantaneously obtained, and accordingly, no waiting is required until the differential output voltage is stabilized. Furthermore, due to the thus-improved responsibility, electricity need not always be supplied to this temperature detecting fuel level detector. For example, the fuel level can be detected simply by supplying an operation voltage Vcc or a predetermined current I at two minute intervals. As a result, the power consumed by the temperature detecting fuel level detector according to the present invention can be significantly reduced, and in addition, the relability of the detecting element can be improved.

In this embodiment, although a fuel level is detected by making a comparison between the sensing resistors which are always dipped into fuel and the other resistors the fuel level may be detected by making a comparison between the sensing resistors which are always exposed to air and the others.

Furthermore, according to this embodiment, chip resistors are employed to serve as the resistors having a relatively low temperature resistance coefficient. As an alternative, it may be formed on the ceramic substrate by printing and baking a glazed resistor made of ruthenium oxide.

As described above, according to the present invention, sensing resistors each capable of indicating a fuel level which corresponds to the shape of the fuel tank are arranged in a pattern, and therefore a fuel level is accurately detected. In addition, the fuel level in different shaped fuel tanks can be readily detected. In addition, a significantly improved response to the temperature detection at an arbitrary fuel level can be obtained by positioning the self-heating sensing resistor and the temperature compensating resistor so as to be thermally isolated from each other. Even if the ambient temperature in a fuel tank is varied, the correction can be automatically conducted, and since the fuel detector according to the present invention is of a temperature detecting type, a detection can be conducted without any occurrence of significant differences with respect to the kinds of gasoline. Furthermore, since the sensing resistor is coated with overcoat glass which exhibits improved tightness and stability, it can maintain its reliability and quality for a long time even if the same is dipped in fuel containing an additive such as alcohol or sulfide. If a plating method or metallic organic paste is employed, a desired thin film pattern of the sensing resistor can be readily formed by means of printing and baking. Therefore, no material loss occurs, and an etching process inevitably associated with a spattering method is obviated, resulting in improved manufacturing yields and reduced costs.

In addition, a temperature detecting fuel level detector formed by mounting chip-shaped temperature detecting elements on a substrate made of, for example, epoxy glass can be readily obtained since a large-sized fuel tank having a substrate of 50 cm in length is available. Further, the substrate can be obtained at a cost lower than that of a ceramic substrate and the detection speed can be increased, due to its relatively small thermal capacity. Consequently, a significant advantage can be obtained in the subject industry.

As described above, according to the present invention, the sensing resistors each capable of indicating a fuel level which corresponds to the shape of a fuel tank are arranged in the pattern, and therefore a fuel level can be accurately detected. In addition, the fuel level in a different shaped fuel tank can be readily detected. Consequently, a significant advantage can be obtained in the subject technical field.

What we claim is:

1. A thermal fuel level detector for detecting a level of fuel remaining in a fuel tank, comprising:
   a substrate;
   a self-heating temperature sensing resistor means formed on said substrate and having a relatively large temperature resistance coefficient and a relatively small resistance value, for detecting its resistance value as a function of its temperature, and self-heating temperature sensing resistor means being adapted to be dipped in said fuel remaining in said fuel tank;
   a temperature compensating temperature sensing resistor means formed on said substrate and having a temperature resistance coefficient substantially equal to a temperature resistance coefficient of said self-heating temperature sensing resistor means and a relatively large resistance value, said temperature compensating sensing resistor means being adapted to be dipped in said fuel to detect an atmospheric temperature within said fuel tank and a temperature of said fuel; and
   an electrical circuit means connected to both said self-heating temperature sensing resistor means and said temperature compensating temperature sensing resistor means for compensating said resistance value detected by said self-heating temperature sensing resistor means for variations in atmospheric temperature and in said temperature of said fuel, whereby a change in said resistance value of said self-heating temperature sensing resistor means responsive to cooling caused by heat of vaporization on a portion thereof which is dipped in said fuel is detected as a differential output voltage which provides an indication of said level of fuel remaining in said fuel tank.

2. A thermal fuel level detector as set forth in claim 1, wherein said self-heating temperature sensing resistor means and said temperature compensating temperature sensing resistor means are substantially equal in length.

3. A thermal fuel level detector as set forth in claim 1, wherein said self-heating temperature sensing resistor means and said temperature compensating temperature sensing resistor means are made of platinum, gold, silver, palladium, ruthenium oxide, copper, nickel, steel, chrome, cobalt or an alloy thereof.

4. A thermal fuel level detector as set forth in claim 1, wherein each of said self-heating temperature sensing resistor means and said temperature compensating temperature sensing resistor means includes a resistor film having its outer surface protected with an insulator such as glass, resin or the like.

5. A thermal fuel level detector for detecting a level of fuel remaining in a fuel tank, comprising:
 a first temperature sensing element including,
  a first substrate; and
  a self-heating temperature sensing resistor means formed on said first substrate and having a relatively high temperature resistance coefficient, for detecting its resistance value as a function of its temperature, said self-heating temperature sensing resistor means being adapted to be dipped in said fuel remaining in said fuel tank;
 a second temperature sensing element including,
  a second substrate; and
  a temperature compensating temperature sensing resistor means formed on said second substrate and having a temperature resistance coefficient substantially equal to a temperature resistance coefficient of said self-heating temperature sensing resistor means, for detecting an ambient temperature within said fuel tank and a temperature of said fuel, said temperature compensating temperature sensing resistor means being dipped in said fuel;
 and
 an electrical circuit means connected to both said first sensing element and said second sensing element to energize both said first sensing element and said second sensing element, for compensating said resistance value detected by said first temperature sensing element for variations in ambient temperature and in said temperature of said fuel, whereby a change in said resistance value of said self-heating temperature sensing resistor means responsive to cooling caused by heat of vaporization on a portion thereof which is dipped in said fuel is detected as a differential output voltage which provides an indication of said level of fuel remaining in said fuel tank.

6. A thermal fuel level detector as set forth in claim 5, wherein said self-heating temperature resistor means of said first temperature sensing element is composed of a plurality of chip-shaped resistors which are formed on said substrate and which have a relatively large temperature resistance coefficient.

7. A thermal fuel level detector as set forth in claim 6, wherein said self-heating temperature sensing resistor means and said temperature compensating temperature sensing resistor means are substantially equal in length.

8. A thermal fuel level detector as set forth in claim 5, wherein said self-heating temperature sensing resistor means and said temperature compensating temperature sensing resistor means are made of platinum, gold, silver, palladium, ruthenium oxide, copper, nickel, steel, chrome, cobalt or an alloy thereof.

9. A thermal fuel level detector as set forth in claim 5, wherein each of said self-heating temperature sensing resistor means and said temperature compensating temperature sensing resistor means includes a resistor film having its outer surface protected with an insulator such as glass, resin or the like.

10. A thermal fuel level detector for detecting a level of fuel remaining in a fuel tank, comprising:
 a first temperature sensing resistance element including,
  a first substrate; and
  a self-heating temperature sensing resistor means comprising a plurality of chip-like self-heating temperature resistors mounted on said first substrate and having a relatively large temperature resistance coefficient, for detecting their own resistance values as a function of their temperatures, said first temperature sensing element being adapted to be dipped in said fuel,
 a second temperature sensing resistance element including,
  a second substrate; and
  a temperature compensating temperature sensing resistor means comprising a plurality of chip-like temperature compensating sensing resistors mounted on said second substrate for detecting an ambient temperature within said fuel tank and a temperature of said fuel, said second temperature sensing element being dipped in said fuel,
 and
 an electrical circuit means connected to said first temperature sensing element and said second temperature sensing element, for energizing the same and for compensating said resistance value detected by said first temperature sensing element for variations in the ambient temperature and in said temperature of said fuel, whereby a variation in said resistance of said self-heating temperature sensing resistor means responsive to cooling caused by heat of evaporation on a portion thereof dipped in said fuel is detected as a differential output voltage which provides an indication of said level of said fuel remaining in said fuel tank.

11. A thermal fuel level detector as set forth in claim 10, wherein said first temperature sensing element and said second temperature sensing element are mounted on one and the same substrate comprising said first and second substrates.

12. A thermal fuel level detector as set forth in claim 10, wherein said self-heating temperature sensing resistor means and said temperature compensating temperature sensing resistor means are made of platinum, gold, silver, palladium, ruthenium oxide, copper, nickel, steel, chrome, cobalt or an alloy thereof.

13. A thermal fuel level detector as set forth in claim 10, wherein said self-heating temperature sensing resistor means and said temperature compensating temperature sensing resistor means includes a resistor film having its outer surface protected with an insulator such as glass, resin or the like.

14. A thermal fuel level detector for detecting a level of fuel remaining in a fuel tank, comprising:
 a substrate;
 a plurality of self-heating temperature sensing resistor means arranged on said substrate in several stages at predetermined intervals and each having a large temperature coefficient, each of said plurality of self-heating temperature sensing resistor means for detecting its resistance as a function of its temperature, said plurality of self heating temperature sensing resistor means being connected in parallel with each other and being adapted to be at least partially dipped in said fuel;

a plurality of second resistor means each having a small temperature resistance coefficient, said plurality of second resistor means being connected in series respectively to said self-heating temperature sensing resistor means and being at least partially dipped in said fuel; and an electrical circuit means connected to said plurality of self-heating temperature sensing resistor means and said plurality of second resistor means for detecting a variation in the resistance of said self-heating temperature sensing resistor means responsive to cooling caused by heat of evaporation on a portion thereof which is dipped in said fuel, as a variation in differential output voltage which provides an indication of said level of fuel remaining in said fuel tank.

15. A thermal fuel level detector as set forth in claim 14, wherein said plurality of self-heating temperature sensing resistor means are chip-like temperature sensing resistors which are formed on an insulating substrate and which are mounted on said substrate in multiple stages, being separated as predetermined intervals.

16. A thermal fuel level detector as set forth in claim 14, wherein each of said self-heating temperature resistor means and said second resistor means are made of platinum, gold, silver, palladium, ruthenium oxide, copper, nickel, steel, chrome, cobalt or an alloy thereof.

17. A thermal fuel level detector as set forth in claim 14, wherein each of said self-heating temperature sensing resistor means and said second resistor means includes a resistor film having its outer surface protected with an insulator such as glass, resin or the like.

18. A thermal fuel level detector as set forth in claim 10, wherein said first substrate and said second substrate each comprise a flexible substrate made of a polyamide or the like which has a low thermal capacity and which is applied on a base made of ceramic or the like by a printing and sintering process.

* * * * *